(12) United States Patent
Rhodes et al.

(10) Patent No.: US 10,573,196 B2
(45) Date of Patent: Feb. 25, 2020

(54) SYSTEMS AND METHODS FOR SIMULATING WIND NOISE MODELS

(71) Applicant: LOON LLC, Mountain View, CA (US)

(72) Inventors: Bradley Rhodes, Mountain View, CA (US); Salvatore J. Candido, Mountain View, CA (US)

(73) Assignee: LOON LLC, Mountain View, CA (US)

( * ) Notice: Subject to any disclaimer, the term of this patent is extended or adjusted under 35 U.S.C. 154(b) by 274 days.

(21) Appl. No.: 15/663,117

(22) Filed: Jul. 28, 2017

(65) Prior Publication Data
US 2019/0035298 A1   Jan. 31, 2019

(51) Int. Cl.
| | | |
|---|---|---|
| G06G 7/48 | (2006.01) |
| G09B 9/24 | (2006.01) |
| G05D 1/10 | (2006.01) |
| G01C 21/20 | (2006.01) |
| B64B 1/40 | (2006.01) |

(52) U.S. Cl.
CPC .............. *G09B 9/24* (2013.01); *G01C 21/20* (2013.01); *G05D 1/105* (2013.01); *B64B 1/40* (2013.01)

(58) Field of Classification Search
None
See application file for complete search history.

(56) References Cited

U.S. PATENT DOCUMENTS

| | | | |
|---|---|---|---|
| 6,628,941 B2 | 9/2003 | Knoblach et al. |
| 7,203,491 B2 | 4/2007 | Knoblach et al. |
| 7,356,390 B2 | 4/2008 | Knoblach et al. |
| 7,469,857 B2 | 12/2008 | Voss |
| 7,801,522 B2 | 9/2010 | Knoblach et al. |
| 8,820,678 B2 | 9/2014 | DeVaul et al. |

(Continued)

FOREIGN PATENT DOCUMENTS

WO   2017/213706 A1   12/2017

OTHER PUBLICATIONS

Navarro, Daniel J., and Thomas L. Griffiths. "Latent features in similarity judgments: A nonparametric Bayesian approach." Neural computation 20.11 (2008): 2597-2628. (Year: 2008).*
Lymperopoulos, Ioannis, and John Lygeros. "Adaptive aircraft trajectory prediction using particle filters." AIAA Guidance, Navigation and Control Conference and Exhibit. 2008. (Year: 2008).*

(Continued)

*Primary Examiner* — Rehana Perveen
*Assistant Examiner* — Nithya J. Moll
(74) *Attorney, Agent, or Firm* — Marton Ribera Schumann & Chang LLP; Chien-Ju Alice Chuang; Hector J. Ribera

(57) ABSTRACT

Disclosed are systems and methods for simulating a flight path of an aerial vehicle. An exemplary method includes receiving a starting point, receiving prevailing wind patterns, generating a smooth model of wind vectors based on the prevailing wind patterns, generating a noise model including one or more submodels simulating regional differences in prevailing wind patterns, determining a wind vector at the starting point, determining a noise value at the starting point, applying the noise value to the wind vector at the starting point to generate a noise added wind vector, determining displacement based on the noise added wind vector over a time step, and determining a waypoint based on the displacement, wherein determining a noise value at the starting point includes determining a portion of the noise value contributed by each submodel, and determining the noise value by calculating a weighted mean of noise values contributed by each submodel.

17 Claims, 4 Drawing Sheets

(56) References Cited

U.S. PATENT DOCUMENTS

| | | | |
|---|---|---|---|
| 8,825,232 B2 | 9/2014 | Knoblach et al. | |
| 8,874,356 B1 * | 10/2014 | Bonawitz | G08G 5/0034 |
| | | | 701/120 |
| 8,967,533 B2 | 3/2015 | DeVaul et al. | |
| 9,014,957 B2 * | 4/2015 | Bonawitz | G08G 5/0034 |
| | | | 701/120 |
| 9,139,279 B2 | 9/2015 | Heppe | |
| 9,296,461 B1 | 3/2016 | Roach | |
| 9,329,600 B2 | 5/2016 | DeVaul et al. | |
| 9,409,646 B2 | 8/2016 | Fleck | |
| 9,418,243 B2 | 8/2016 | Bauer et al. | |
| 9,419,902 B1 | 8/2016 | Sites | |
| 9,420,023 B2 | 8/2016 | Ramamurthy et al. | |
| 9,424,752 B1 * | 8/2016 | Bonawitz | G01C 21/20 |
| 9,519,045 B2 | 12/2016 | Knoblach et al. | |
| 9,632,503 B2 | 4/2017 | Knoblach et al. | |
| 9,665,103 B1 * | 5/2017 | Bonawitz | G05D 1/105 |
| 9,836,063 B1 | 12/2017 | Bonawitz et al. | |
| 2010/0230968 A1 | 9/2010 | Chernyshov | |
| 2015/0379408 A1 | 12/2015 | Kapoor et al. | |

OTHER PUBLICATIONS

Lee, Je Hyeon et al. "Estimation of Maneuvering Aircraft States and Time-Varying Wind with Turbulence." Aerospace Science and Technology, vol. 31, No. 1, Dec. 31, 2013 (Dec. 31, 2013), pp. 87-98, XP028768346, ISSN: 1270-9638, DOI: 10.1016/J.AST.2013.09.009.

Al Masri, Mohammed et al. "Autolanding a Power-off UAV Using On-line Optimization and Slip Maneuvers." Journal of Intelligent and Robotic Systems, Kluwer Dordrecht, NL, vol. 86, No. 2, Jan. 14, 2017 (Jan. 14, 2017), pp. 255-276, XP036201732, ISSN: 0921-0296, DOI: 10.1007/S10846-016-0455-8 [retrieved on Jan. 14, 2017].

Michael T. Wolf et al. "Probabilistic Motion Planning of Balloons in Strong, Uncertain Wind Fields." 2010 IEEE International Conference on Robotics and Automation: ICRA 2010; Anchorage, Alaska, USA, May 3-8, 2010, IEEE, Piscataway, NJ, USA, May 3, 2010 (May 3, 2010), pp. 1123-1129, XP031743072, ISBN: 978-1-4244-5038-1.

International Search Report and Written Opinion for PCT Application No. PCT/US2018/039953, dated Sep. 28, 2018. 17 pages.

* cited by examiner

SYSTEMS AND METHODS FOR SIMULATING WIND NOISE MODELS

BACKGROUND

Technical Field

The present disclosure relates to simulating wind noise models, and, more particularly, to systems and methods for simulating wind noise based on prevailing wind patterns and a deterministic noise model.

Description of Related Art

Unmanned aerial vehicles may travel at very high altitudes, including up to approximately 20 kilometers above the Earth's surface in the stratosphere, which is well above the altitudes of airplanes, wildlife, and weather events. In the stratosphere, winds are stratified, and each layer of wind may vary in speed and/or direction. Flight paths for the aerial vehicles may be simulated using predicted and/or historically observed prevailing weather patterns. However, reliance on predicted and observed weather data alone may be undesirable when simulating flight paths of the aerial vehicles because the weather data may be locally inaccurate, unavailable, and/or not have sufficient resolution to be accurate. Improvements in systems and methods for simulating flight paths of aerial vehicles are described hereinbelow.

SUMMARY

Provided in accordance with embodiments of the present disclosure is a method for simulating a flight path of an aerial vehicle. In an aspect of the present disclosure, the method includes receiving data regarding a starting point of the flight path, receiving data regarding prevailing wind patterns, generating a smooth model of wind vectors based on the data regarding prevailing wind patterns, generating a noise model, the noise model including one or more submodels simulating regional differences in prevailing wind patterns, determining a wind vector at the starting point, determining a noise value at the starting point, applying the noise value to the wind vector at the starting point to generate a noise added wind vector, determining displacement based on the noise added wind vector over a predetermined time step, and determining a waypoint based on the displacement, wherein determining a noise value at the starting point includes determining a portion of the noise value contributed by each submodel, and determining the noise value by calculating a weighted mean of noise values contributed by each submodel.

In yet another aspect of the present disclosure, the smooth model of wind vectors is generated using quad-linear interpolation.

In yet a further aspect of the present disclosure, the method further includes receiving data regarding an objective, and determining that the waypoint satisfies the objective.

In another aspect of the present disclosure, the method further includes receiving data regarding an objective, determining that the waypoint does not satisfy the objective, determining a wind vector at the waypoint, determining a noise value at the waypoint, applying the noise value at the waypoint to the wind vector at the waypoint to generate a noise added wind vector at the waypoint, determining displacement based on the noise added wind vector at the waypoint over a predetermined time step, and determining another waypoint based on the displacement.

In a further aspect of the present disclosure, the method further includes receiving an instruction to change altitude to a new altitude, and determining the wind vector at the waypoint includes determining the wind vector at the waypoint at the new altitude.

In another aspect of the present disclosure, the noise model further includes one or more submodels simulating seasonal differences in prevailing wind patterns.

In yet another aspect of the present disclosure, the noise model is mapped to an unfolded unit cube.

In still another aspect of the present disclosure, the prevailing wind pattern is based on a speed and a direction of winds.

In yet a further aspect of the present disclosure, the noise model is a deterministic noise pattern for any point defined in four dimensions.

In a further aspect of the present disclosure, the four dimensions of the noise model include latitude, longitude, altitude, and time.

In another aspect of the present disclosure, the noise value for a particular point defined in four dimensions is correlated to other points within a specified distance from the particular point.

In a further aspect of the present disclosure, the specified distance includes one or more of a horizontal distance, a vertical distance, and a temporal difference.

In another aspect of the present disclosure, the horizontal distance is a zonal and/or meridional distance measured from the particular point.

In yet another aspect of the present disclosure, the vertical distance is measured in an altitudinal distance from the particular point.

In still another aspect of the present disclosure, the altitudinal distance is measured based on a pressure metric.

In yet another aspect of the present disclosure, the noise model is generated based on a seed value.

In a further aspect of the present disclosure, a noise model generated based on a first seed value and a noise model generated based on a second seed value have different noise values at a particular point.

In another aspect of the present disclosure, the method further includes displaying the flight path on a map.

Provided in accordance with embodiments of the present disclosure is a system for simulating a flight path of an aerial vehicle. In an aspect of the present disclosure, the system includes an aerial vehicle and a computing device including a processor and a memory storing instructions which, when executed by the processor, cause the computing device to receive data regarding a starting point of the flight path, receive data regarding prevailing wind patterns, generate a smooth model of wind vectors based on the data regarding prevailing wind patterns, generate a noise model, the noise model including one or more submodels simulating regional differences in prevailing wind patterns, determine a wind vector at the starting point, determine a noise value at the starting point, apply the noise value to the wind vector at the starting point to generate a noise added wind vector, determine displacement based on the noise added wind vector over a predetermined time step, and determine a waypoint based on the displacement, wherein determining a noise value at the starting point includes determining a portion of the noise value contributed by each submodel, and determining the noise value by calculating a weighted mean of noise values contributed by each submodel.

Provided in accordance with embodiments of the present disclosure is a non-transitory computer-readable storage medium storing a program for simulating a flight path of an aerial vehicle, the program including instructions which, when executed by a processor, cause a computing device to receive data regarding a starting point of the flight path, receive data regarding prevailing wind patterns, generate a smooth model of wind vectors based on the data regarding prevailing wind patterns, generate a noise model, the noise model including one or more submodels simulating regional differences in prevailing wind patterns, determine a wind vector at the starting point, determine a noise value at the starting point, apply the noise value to the wind vector at the starting point to generate a noise added wind vector, determine displacement based on the noise added wind vector over a predetermined time step, and determine a waypoint based on the displacement, wherein determining a noise value at the starting point includes determining a portion of the noise value contributed by each submodel, and determining the noise value by calculating a weighted mean of noise values contributed by each submodel.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

Figure 1:
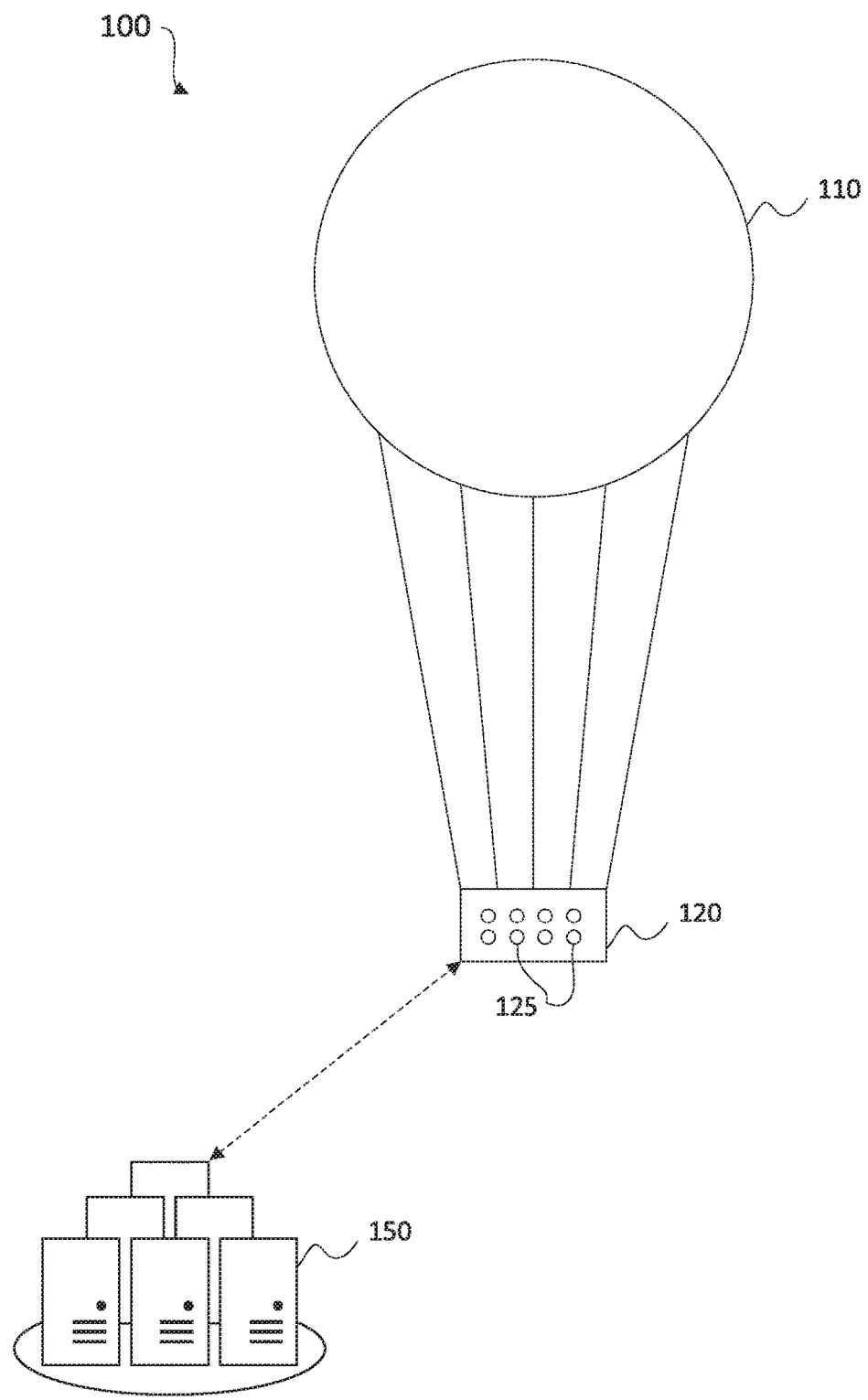
FIG. 1 is a schematic diagram of an exemplary system that may be used for simulating a course of an aerial vehicle, according to an embodiment of the present disclosure.

The present disclosure relates to systems and methods for simulating wind noise models. More particularly, the present disclosure relates to generating wind noise models based on models of prevailing wind patterns at a given point defined in latitude, longitude, altitude, and time. Such wind noise models may be used in various applications, as described below, an example being simulating a flight path of an aerial vehicle. For example, the wind noise models may be used to simulate a realistic flight path or course of a wind-affected aerial vehicle based on prevailing wind patterns and a deterministic noise model. The flight path of the aerial vehicle may be defined as the path or course, from a starting location to a destination or other objective, along which the aerial vehicle will be driven by the winds. Prevailing wind patterns may include a prevailing direction and speed of the wind (referred to hereinafter as a wind vector) at a particular location defined in latitude and longitude, at a particular altitude, and at a particular time (referred to hereinafter as "a point" or "a point defined in four dimensions"; the four dimensions being latitude, longitude, altitude, and time). Wind vectors may include zonal (east-west) and meridional (north-south) components measured in meters per second (m/s), kilometers per hour (km/h), etc. Latitude and longitude may be based on the geographic coordinate system and/or any other global coordinate system, for example, GOOGLE's S2.

Altitude may be a distance above sea level or another metric corresponding to or substituting for a measured distance above sea level. For example, in some embodiments, altitude may represented by a pressure metric, such as atmospheric pressure. Time may be a particular date and time, for example, as defined in seconds, minutes, hours, days, months, and years. In some embodiments, time may be defined as an elapsed time since a particular point in time, such as UNIX® time, i.e., the number of seconds since 00:00:00 on Jan. 1, 1970. The flight path of the aerial vehicle may be generated based on the prevailing wind vectors at particular points to determine a direction and/or speed at which the aerial vehicle will be driven by the winds at those particular points.

In some embodiments, a destination or objective of the aerial vehicle is not provided, and instead the flight path of the aerial vehicle is determined simply based on the prevailing wind patterns. For example, the aerial vehicle may not have an altitude control system, and thus would remain at approximately the same altitude throughout its journey. In other embodiments, the aerial vehicle may have a predetermined control policy to change the altitude of the aerial vehicle to predetermined altitudes at predetermined times. In each of these embodiments, the flight path of the aerial vehicle is determined based on the prevailing wind patterns without a destination or objective. In still further embodiments, an objective may be provided without a particular destination. For example, the objective may be to move the aerial vehicle in a particular direction but not to a particular point. In another example the objective may be to maximize a distance of the aerial vehicle from other aerial vehicles in the vicinity, or to coordinate the position of the aerial vehicle relative to other aerial vehicles in the vicinity based on a fleet management plan. In yet another embodiment, both a destination and an objective may be provided. For example, the destination may be a particular location, and the objective may be to reach the destination at a particular time. As such, those skilled in the art will recognize that the determined flight path of the aerial vehicle will be different depending on whether the destination and/or objective is provided, as well as what the destination and/or objective is.

In addition to simulating flight paths, the noise model may also be used when performing static analysis of historical winds at various locations. For example, as described further below, regional and/or seasonal noise models may be generated for particular regions around the globe and particular times of the year. The regional and/or seasonal noise models may be based on historical patterns of prevailing winds for the various regions and/or seasons and take into account the differences in historical patterns of prevailing winds between the various regions and/or seasons. The noise models may then be used to determine how maneuverable a particular region is over time.

Flight paths may be simulated using predicted (forecasted) wind vectors, actual observations of (real-time) wind vectors, historically recorded observations of (historical) wind vectors, and/or old predictions of (hindcasted) wind vectors at particular points. While actual observations (whether real-time or historical) are accurate representations of wind vectors at their exact points of observation, such observations are limited to such exact points. Observations are not taken at all possible points, and distances between observation points (whether in latitude, longitude, and/or altitude) may be too big to be reliable, such that actual observations may be very unreliable when adjusting for temporal differences. Thus, relying solely on actual observations is impractical.

Wind predictions (whether forecasted or hindcasted) may be used to fill in the gaps between actual observations for real-time and/or historical wind vectors and may be the sole source of data for future predictions of wind vectors, but wind predictions are also not always accurate, and differences between predicted and actual wind vector observations at a particular point may vary greatly. Further, wind predictions made by weather services are not made for all points. Thus, in order to predict a wind vector at points not included in the wind predictions of weather services, predictions may be interpolated for such points. For example, quad-linear interpolation may be used to determine a likely wind vector at points between two or more predicted and/or observed points. Such interpolated wind vectors will represent a smooth variation between predicted and/or observed points. However, even such interpolated wind vectors may not be accurate, because they may rely on predicted wind vectors (which may in itself be inaccurate), and variances between points are not necessarily smooth. In fact, wind vectors may vary greatly locally, and thus a smooth interpolated model of wind vectors may not represent such local variances.

During simulated flight path planning, such as to test planning algorithms and methods, a realistic model of wind vectors is preferred, even if such a realistic model is not an accurate model. While a smooth interpolated model is useful to "fill in the gaps" between observed wind vectors and/or predicted weather data, such a smooth interpolated model is inherently unrealistic. As such, after the smooth interpolated model is generated, noise may be added to simulate local variances from the smooth interpolation between predicted and/or observed points. Adding such noise to the smooth interpolated model does not make it more accurate (in fact it may make it less accurate), but adding the noise to the smooth interpolated model will make the model more realistic. Thus, flight paths planned using added noise will be useful for testing planning algorithms and methods, but may not be more reliable than predicted weather data for planning actual flight paths for aerial vehicles. In addition, adding noise to a historical forecast may be used to test a planning algorithm's performance when accounting for forecast error, where the noise is used to replicate forecast error seen in reality.

The noise added to the smooth interpolated model may be based on a model of forecast error, e.g., a model of the local variation in wind vectors between forecast points as well as errors in the forecast itself. The noise model may be deterministic, such that noise generated at a particular point will be consistent across multiple instances of the noise model generated based on the same seed value. For example, every noise model generated based on the same input parameters (e.g., the four dimensions of the particular point, the seed value, and various other parameters) will be identical. The other parameters may include an overall mean, a variance, a scaling metric (e.g. a metric for how quickly noise at one point becomes uncorrelated with noise at another point), and/or a shape of such decorrelation. Further, the noise model may be procedurally-generated based solely on the parameters and the seed value, with no state or other data needing to be retained for future instances of the noise model. Algorithms for generating such noise models are efficient; they are fast to compute and do not require large memory footprints. Such algorithms are also stateless because they do not require storage of previously computed values.

Multiple instances of the noise model generated with different parameters may be combined or layered to simulate many desired characteristics. Further, a single noise model may be composed of multiple submodels. For example, a separate submodel may be generated for zonal wind speed as well as meridional wind speed, as well as other simulated variables (e.g., temperature, upwelling longwave radiative flux, etc.). Each submodel may have its own parameters (i.e., mean, variance, shape, and seed value). Seed values for submodels may be generated based on a master seed value. In some embodiments, multiple instances of the noise model may be generated for various regional and/or seasonal differences, and each instance of the noise model may include one or more submodels based on the aforementioned parameters. For example, some of the various submodels of the noise model may represent various regions of the globe which have historically seen different and/or uncorrelated prevailing wind patterns. Similarly, each region may have multiple submodels representing different seasons or other time periods which have historically seen different and/or uncorrelated prevailing wind patterns. Points sampled within a predetermined distance from an edge or border of a region (and likewise the end of one season or time period and start of the next) may be influenced by neighboring regions (and/or seasons). For example, the amount of influence one submodel (whether it be regional or seasonal) has on wind noise at a particular point may be computed based on a sliding scale, with points closer to an edge or border of a submodel seeing more influence from neighboring submodels, and points further from an edge or border of a submodel seeing less influence from neighboring submodels, up to a threshold where neighboring submodels are too distant and have no influence. In some embodiments, the amount of influence various submodels have on a particular point may be pre-calculated as a proportional value corresponding to the distance from an edge or border of the submodel to the point. For example, a point falling exactly on the border between two submodels will have influence evenly split between the two models.

Thus, the noise model may be applied to wind vectors at any point in the smooth interpolated model to account for local changes and/or variations ("noise") in the prevailing winds and/or forecast error not represented in the smooth interpolated model, to thereby generate realistic variances in wind vectors. For example, a simulated flight path of the aerial vehicle may be generated based on the smooth interpolated model, and noise may be added to the wind vectors at each point corresponding to a time step of the simulated flight path to generate a realistic simulated flight path, as further described below.

The noise model may be generated based on the simplex noise algorithm, although those skilled in the art will appreciate that other algorithms may also be used without departing from the scope of the present disclosure. The noise model may be a smooth four-dimensional noise model. That is, the noise model may be a deterministic (globally consistent) noise pattern having a noise value for any point defined in the four dimensions of longitude, latitude, altitude, and time. In an exemplary embodiment, the noise model generated based on the simplex noise algorithm may be a virtual four-dimensional continuous space of smoothly varying noise. The noise model may then be mapped to the four dimensions of latitude, longitude, altitude, and time, and scaled along various dimensions to achieve a desired rate at which the noise changes as the point at which the noise is sampled is changed.

Further, the noise value for a particular point is correlated to the noise value for other points within a predetermined distance from the particular point. For example, the predetermined distance may include one or more of a horizontal distance, a vertical distance, and/or a temporal difference.

In embodiments, the horizontal distance is a zonal (east-west) and/or meridional (north-south) distance measured from the particular point, and the vertical distance is measured in an altitudinal distance from the particular point. In an example, the range of the horizontal distance (i.e., the zonal and meridional distances from the particular point) may be 600 kilometers zonal and 400 kilometers meridional, the range of the vertical distance (i.e., the altitudinal difference) may be measured based on an atmospheric pressure metric and may be 600 Pascals, and the range of the temporal difference may be six hours. Thus, noise values for points that are close together will be highly correlated, while noise values for points further apart but within the specified distances will be less correlated, and noise values for points more than the specified distances apart will be uncorrelated with each other.

Further, each dimension (latitude, longitude, altitude, time) may be independently calibrated with its own scaling metric and/or correlation distance. That is, noise values of points that are more than the specified distance apart in any of the four dimensions will be uncorrelated, and the distance apart in each of the four dimensions will affect the correlation of the noise values of the points.

With reference to FIG. 1, there is shown a system 100 for controlling an aerial vehicle, according to an embodiment of the present disclosure. System 100 may include an aerial vehicle 110, a controller for aerial vehicle 120, various sensors 125, and a computing device 150. Aerial vehicle 110 may be, for example, a balloon carrying a payload. However, those skilled in the art will recognize that the systems and methods disclosed herein may similarly apply and be usable by other types of aerial vehicles. Thus, aerial vehicle 110 may be any aerial vehicle driven or affected by wind.

Controller 120 may be a computing device and/or other logic circuit configured to control aerial vehicle 110. In an embodiment, controller 120 may be coupled to aerial vehicle 110. Controller 120 may include various sensors 125. Sensors 125 may include one or more position sensors such as, for example, Global Positioning System (GPS) sensors, magnetic compasses, motion sensors such as accelerometers and gyroscopes, altitude sensors such as altimeters, wind speed and/or direction sensors such as wind vanes and anemometers, temperature sensors such as thermometers, resistance temperature detectors, and speed of sound temperature sensors, pressure sensors such as barometers and differential pressure sensors, and/or a sensor for measuring upwelling longwave radiation, etc. These examples of sensors are not intended to be limiting, and those skilled in the art will appreciate that sensor 125 may include other sensors or combinations of sensors without departing from the scope of the present disclosure. Controller 120 may further include or be coupled to an imaging device, such as a downward-facing camera and/or a star tracker. Further, controller 120 may transmit location information regarding aerial vehicle 110 to an automatic packet reporting system (APRS) receiver, which in turn relays the location information to computing device 150.

Computing device 150 may be a computing device configured to control the operations of controller 120, and thus aerial vehicle 110. Computing device 150 may be any computing device configurable for use in simulating a flight path of aerial vehicle 110 and/or controlling and planning a course for aerial vehicle 110 known to those skilled in the art. For example, computing device 150 may be a desktop computer, laptop computer, tablet computer, smart phone, server and terminal configuration, and/or any other computing device known to those skilled in the art. In some embodiments, computing device 150 and controller 120 are a single, unified device coupled to aerial vehicle 110. In other embodiments, computing device 150 may be coupled to aerial vehicle 110 as a separate device from controller 120. In still further embodiments, computing device 150 may be a datacenter located remote from aerial vehicle 110 and may communicate with and/or control the operations of controller 120 via a network. As described further below, system 100 may be used for simulating a flight path for aerial vehicle 110 based on data related to prevailing wind patterns and a noise model.

Figure 2:
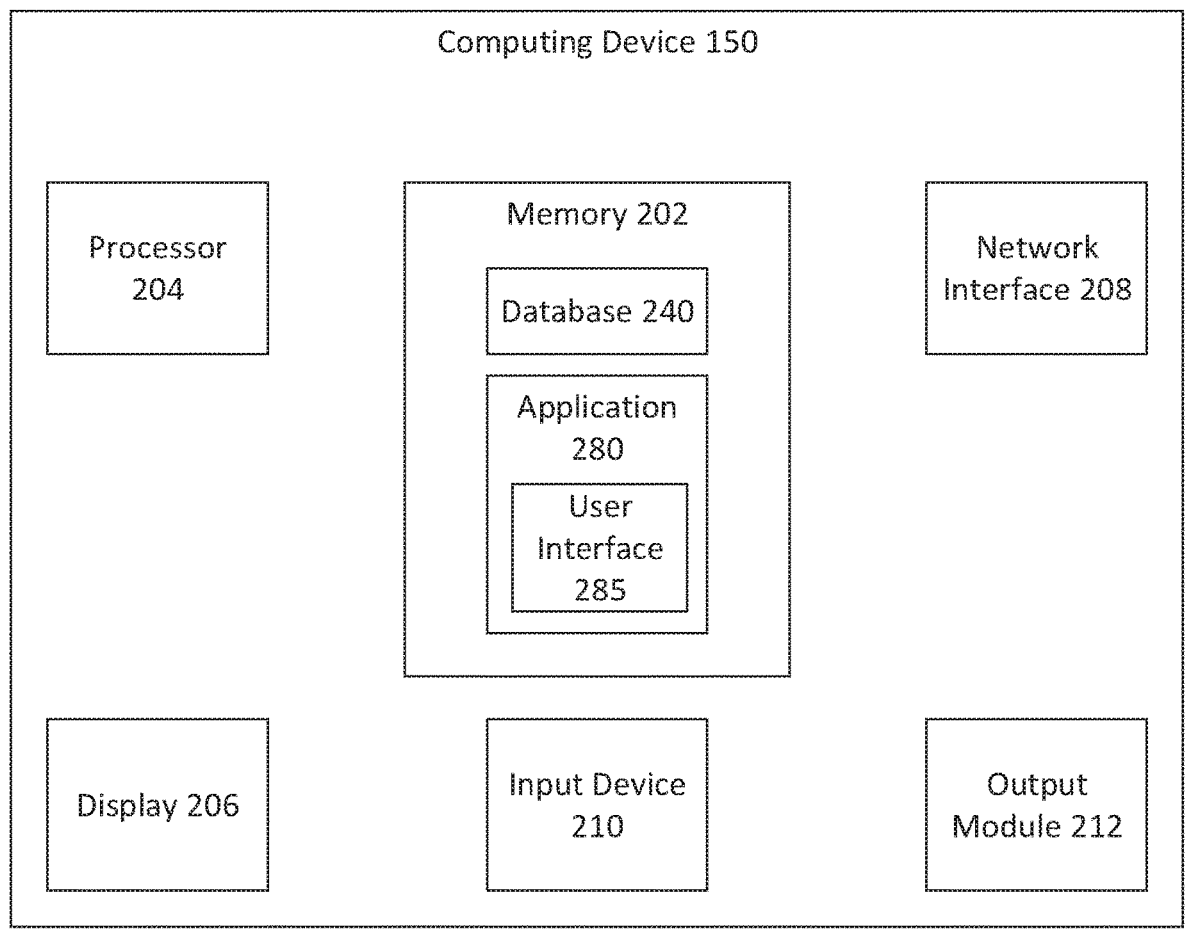
FIG. 2 is a simplified block diagram of an exemplary computing device forming part of the system of FIG. 1.

Turning now to FIG. 2, there is shown a schematic diagram of computing device 150 forming part of system 100 of FIG. 1, according to an embodiment of the present disclosure. Computing device 150 includes a memory 202 storing a database 240 and an application 280. Application 280 may include instructions which, when executed by processor 204, cause computing device 150 to perform various functions, as described below. Application 280 further includes instructions for generating a graphical user interface (GUI) 285. Database 240 may store various algorithms and/or data, including data regarding prevailing wind patterns, as further described below.

Memory 202 may include any non-transitory computer-readable storage medium for storing data and/or software that is executable by processor 204 and that controls the operation of computing device 150. In an embodiment, memory 202 may include one or more solid-state storage devices such as flash memory chips.

Alternatively, or in addition to the one or more solid-state storage devices, memory 202 may include one or more mass storage devices connected to processor 204 through a mass storage controller (not shown) and a communications bus (not shown). Although the description of computer-readable media included herein refers to a solid-state storage, it should be appreciated by those skilled in the art that computer-readable storage media may be any available media that may be accessed by processor 204. That is, computer-readable storage media may include non-transitory, volatile and non-volatile, removable and non-removable media implemented in any method or technology for storage of information such as computer-readable instructions, data structures, program modules or other data. For example, computer-readable storage media may include RAM, ROM, EPROM, EEPROM, flash memory or other solid state memory technology, CD-ROM, DVD, BLU-RAY DISC® or other optical storage, magnetic cassettes, magnetic tape, magnetic disk storage or other magnetic storage devices, or any other medium which may be used to store the desired information and which may be accessed by computing device 150.

Computing device 150 may further include a display 206, a network interface 208, an input device 210, and/or an output module 212. Display 206 may be any display device by means of which computing device 150 may output and/or display data, such as via GUI 285. Network interface 208 may be configured to connect to a network such as a local area network (LAN) consisting of a wired network and/or a wireless network, a wide area network (WAN), a wireless mobile network, a BLUETOOTH® network, a satellite network, and/or the internet. Input device 210 may be a mouse, keyboard, or other hand-held controller, touch screen, voice interface, and/or any other device or interface by means of which a user may interact with computing device 150. Output module 212 may be a bus, port, and/or other interface by means of which computing device 150 may connect to and/or output data to other devices and/or peripherals.

Figure 3:
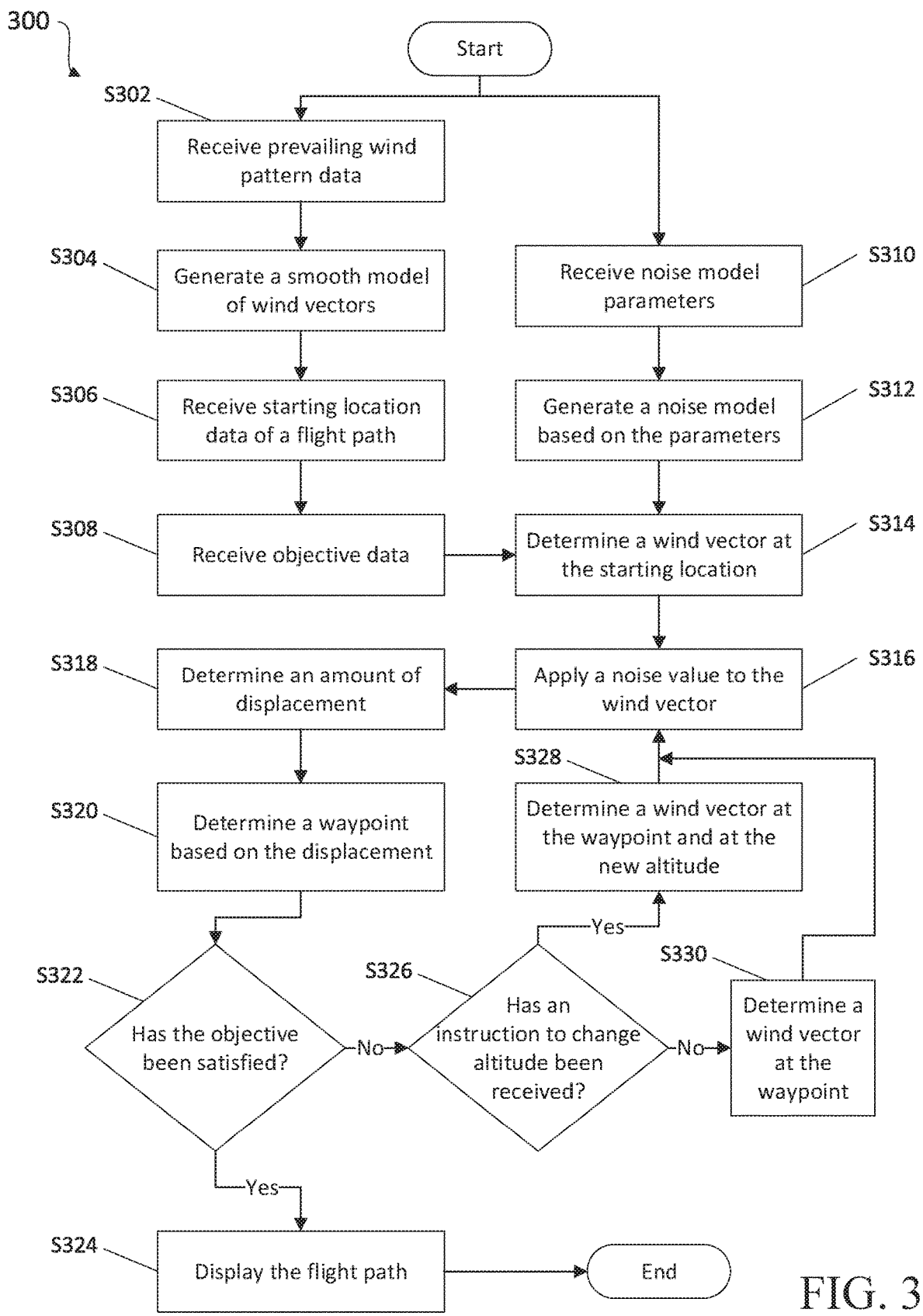
FIG. 3 shows a flowchart of an exemplary method for simulating a flight path of an aerial vehicle, according to an embodiment of the present disclosure.

With reference to FIG. 3, there is shown a flowchart of an exemplary method 300 for simulating a realistic flight path of an aerial vehicle, such as aerial vehicle 110, according to an embodiment of the present disclosure. While the various steps of method 300 are described below in an ordered sequence, those skilled in the art will recognize that some or all of the steps of method 300 may be performed in a different order or sequence, repeated, and/or omitted without departing from the scope of the present disclosure.

Method 300 may start at step S302, where computing device 150 receives data regarding prevailing wind patterns. The data regarding the prevailing wind patterns may include a prevailing wind vector (i.e., a wind direction and/or wind speed). In embodiments, the data regarding prevailing wind patterns may be a subset of data for a particular geographic area. The data regarding the prevailing wind patterns may be received from one or more external data sources, such as a weather observatory or weather service, examples of which are the Global Forecast System (GFS) operated by the National Oceanic and Atmospheric Administration (NOAA), and the European Center for Medium-range Weather Forecasts (ECMWF). Additionally or alternatively, the data regarding the prevailing wind pattern may be received from one or more sensors 125. In some embodiments, the data regarding the prevailing wind pattern may be determined based on a combination of sources, such as external sources and/or sensors 125.

Thereafter, at step S304, computing device 150 generates a smooth model of wind vectors based on the data regarding prevailing wind patterns received at step S302. In embodiments, the smooth model of wind vectors may be generated using interpolation to fill in the gaps between points in the data regarding prevailing wind patterns, as described above.

Thereafter, at step S306, computing device 150 receives data regarding a starting location of the flight path of aerial vehicle 110. For example, the starting location of the flight path may be a particular point defined in four dimensions. The data regarding the starting location of the flight path may be entered or selected by a user of computing device 150, such as via input device 210, and/or may be received from an external source. In some embodiments, the data regarding the starting location of the flight path is received from one or more sensors 125, such as a GPS sensor. The data regarding the starting location of the flight path may also be received location information of aerial vehicle 110 relayed by an automatic packet reporting system (APRS). In some embodiments, additional data, such as a fuel level and/or battery charge level, as well as a permitted altitude range may also be received.

Thereafter, or concurrently therewith, at step S308, computing device 150 receives data regarding an objective of aerial vehicle 110. For example, objective may be a destination, such as a target location toward which aerial vehicle 110 should be moved, and may be defined in at least latitude and longitude. In other embodiments, the objective may be a target direction, target arrival time, distance from other aerial vehicles in the vicinity, etc. As with the starting location data, the data regarding the objective may be entered or selected by a user of computing device 150, such as via input device 210, and/or may be received from an external source.

Thereafter, or concurrently with steps S302-S308, at step S310 computing device 150 parameters for generating a noise model. The parameters may include a seed value, for example, a 32-bit number, that specifies the random permutations that are used to generate the wind noise model. The seed value may define the noise model such that a noise model generated based on a particular seed value and a noise model generated based on a different seed value will have different and uncorrelated noise values at a particular point, even if all the other parameters of the noise model are consistent. The seed value may be entered by a user of computing device 150, such as via input device 210. Computing device 150 may further receive additional parameters for generating the noise model, as described above.

Computing device then, at step S312, generates a noise model based on the parameters received at step S310. The noise model may be generated based on the simplex noise algorithm as described above, and may further be based one or more points, a geographic region, and/or a season or time of the year, as described above. The noise model may include one or more submodels, as described above.

Next, at step S314, computing device 150 determines a wind vector at the point corresponding to the starting location (referred to hereinafter as the starting point), which is determined based on the data received at step S306. The wind vector at the starting point may be determined based on the smooth model of wind vectors generated at step S304.

Figure 3A:
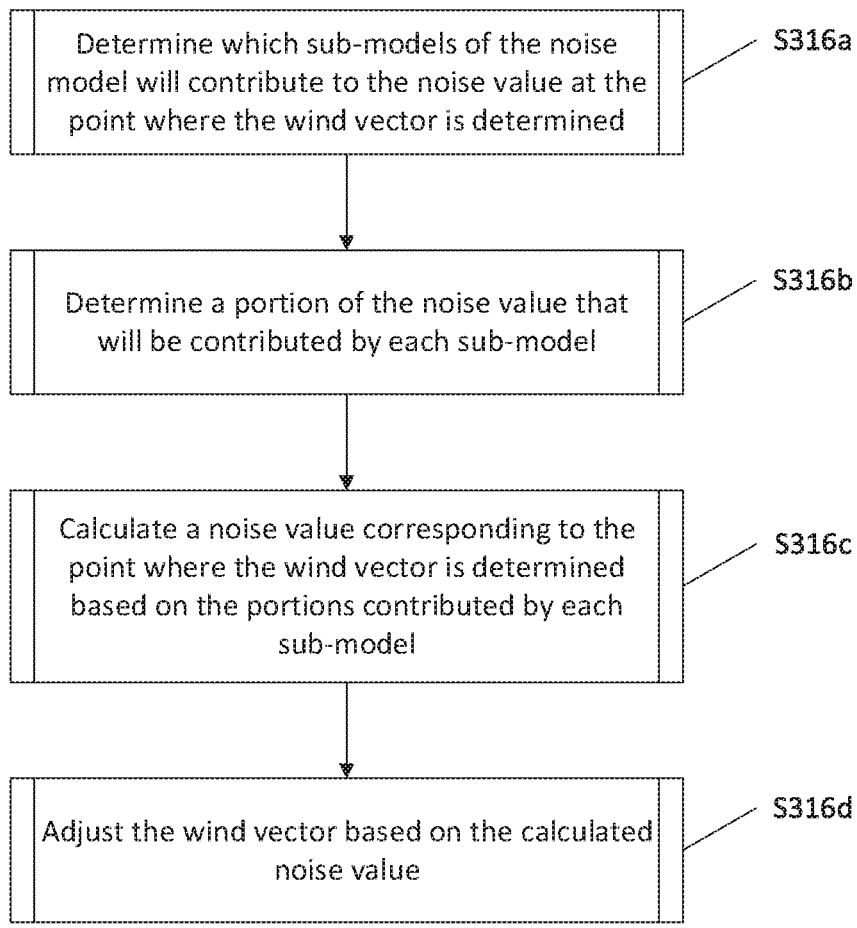
FIG. 3A shows a flowchart of a sub-process of one of the steps of the flowchart of FIG. 3.

Thereafter, at step S316, computing device 150 applies the noise value associated with the starting point to the wind vector at the starting point (as determined at step S314) to generate a noise-added wind vector. Alternatively, as described further below, computing device 150 may apply the noise value associated with a waypoint of the flight path (determined at step S320) to a wind vector at the waypoint (determined at step S328 or S330) to generate a noise added wind vector. Step S316 may include one or more sub-steps, as shown in FIG. 3A. For example, at step S316a, computing device 150 may determine which submodels of the noise model generated at step S312 will contribute to the noise value at the point where the wind vector is determined (at either step S314, step S328, or step S330). For example, computing device 150 may determine which submodels of the noise model are within a predetermined distance or a predetermined time from the point where the wind vector is determined.

Thereafter, at step S316b, computing device 150 may determine a portion of the noise value that will be contributed by each submodel. For example, the portion of the noise value contributed by each submodel may be based on each submodel's distance in space and/or time from the point where the wind vector is determined, such that submodels close to the point where the wind vector is determined have a larger contribution to (and thus greater influence on) the noise value. In embodiments, the noise model and the submodels are mapped to an unfolded unit cube, and thus, to determine the portion of the noise value that submodels will contribute, the coordinates of the point where the wind vector is determined must first be transformed to raw coordinates and the latitude and longitude coordinates mapped to the unfolded unit cube.

Since each submodel has its own scaling metric and other parameters, as described above, in some embodiments the point at which the wind vector is determined may be scaled in each of the four dimensions based on the scaling metric to determine a distance from the point where the wind vector is determined at which the noise becomes uncorrelated. Further, if the point where the wind vector is determined is within a predetermined distance of a seam (or edge) of a face of the unfolded unit cube, parameters and/or noise from multiple faces may have to be blended to determine a noise value for a point within the predetermined distance of the seam.

At step S316c, computing device 150 calculates a noise value corresponding to the point where the wind vector is determined. The noise value may be proportionally based on the portion each submodel is determined to contribute to the noise value. In embodiments, a noise value may be determined for each scaling metric and/or other parameter of each submodel determined to contribute to the noise value at step S316a. The noise values associated with each submodel may have a weight associated with them, and computing device 150 may calculate a weighted mean of the noise values associated with each submodel. In such embodiments, the noise value calculated at step S316c may be based on a blend of the noise values associated with each submodel, where a blended random variable has a mean equal to the weighted mean of the means and a variance equal to the weighed mean of the variances of a noise random variable associated with each contributing submodel. The blend may be calculated, for example, by first computing the weighted mean of the noise values associated with each submodel, computing the mean and variance of the resulting random variable, and then shifting and/or scaling the result such that the mean and variance of the resulting shifted and scaled random variable has the desired mean and variance. Thereafter, at step S316d, computing device 150 adjusts the wind vector determined at step S314, S328, or S330 based on the noise value calculated at step S316c.

Returning now to FIG. 3, at step S318, computing device 150 determines an amount of displacement over a predetermined time step. For example, the time step may be an hour, and computing device 150 may determine the amount of displacement by calculating the direction and distance that aerial vehicle 110 will be moved over an hour based on the noise-added wind vector.

Thereafter, at step S320, computing device 150 determines a waypoint based on the amount of displacement over the time step determined at step S318. For example, the waypoint is the point to which aerial vehicle 110 would be moved based on the displacement over the time step. Thus, as used herein, the term waypoint is defined as a point corresponding to the location of the flight path after accounting for displacement during all previous time steps.

Computing device 150 then, at step S322, determines whether the objective has been satisfied. For example, computing device 150 may determine whether the waypoint determined at step S320 corresponds to a destination objective received at step S308. In other embodiments, computing device 150 may determine that the objective has been satisfied when aerial vehicle 110 is within a predetermined distance of a target, when the flight of aerial vehicle 110 has been terminated, and/or after a predetermined amount of time has passed or a predetermined number of time steps have been calculated. For example, in some embodiments, it may be impossible to satisfy the objective based on the prevailing wind conditions. In such embodiments, the objective may be deemed satisfied after a predetermined amount of time has passed or a predetermined number of attempts have been completed. If computing device 150 determines that the objective has been satisfied ("Yes" at step S322), processing proceeds to step S324, where computing device 150 causes a display device, such as display 206, to display the flight path, such as on a map, where after processing ends.

Alternatively, if computing device 150 determines that the flight path has not reached the destination ("No" at step S322), processing proceeds to step S326, where computing device determines whether an instruction to change altitude has been received. The instruction to change altitude may be received based on a control policy of aerial vehicle 110, and/or a flight path planning algorithm. For example, the control policy of aerial vehicle 110 may require that the altitude of aerial vehicle 110 be changed after a predetermined amount of time. In another example, the flight path planning algorithm may determine an optimal altitude for aerial vehicle 110 based on prevailing wind pattern data, such as the prevailing wind pattern data received at step S302, and/or the smooth model of wind vectors generated at step S304. Additional details regarding flight path planning algorithms are described in commonly-owned U.S. patent application Ser. No. 15/662,940, entitled SYSTEMS AND METHODS FOR CONTROLLING AERIAL VEHICLES, filed on Jul. 28, 2017, by Candido et al., the entire contents of which are incorporated by reference herein. Further, as noted above, in some embodiments, the control policy of aerial vehicle 110 may be part of a fleet management plan, and may take the positions of other aerial vehicles in the vicinity of aerial vehicle 110 into account when determining the flight path of aerial vehicle 110.

If computing device 150 determines that an instruction to change altitude has been received ("Yes" at step S326), processing proceeds to step S328, where computing device 150 determines a wind vector at the waypoint at the altitude corresponding to the instruction to change altitude. In some embodiments, aerial vehicle 110 may be unable to reach the new altitude before reaching the next waypoint, either because the vertical distance between the current altitude and the new altitude is too great, or due to local weather conditions at the location of aerial vehicle 110. In such embodiments, computing device 150 may determine a wind vector at the waypoint at an intermediate altitude corresponding to the altitude to which aerial vehicle 110 is able to change when it reaches the waypoint. The wind vector at the waypoint may be determined based on the smooth model of wind vectors generated at step S304.

Alternatively, if computing device 150 determines that an instruction to change altitude has not been received ("No" at step S326), processing proceeds to step S330, where computing device 150 determines a wind vector at the waypoint at the same altitude as the starting point or previous waypoint. As with step S328, the wind vector at the waypoint may be determined based on the smooth model of wind vectors generated at step.

After either step S328 or S330 is performed, processing returns to step S326, where computing device 150 applies the noise value associated with the waypoint to the wind vector determined at either step S328 or S330. Processing then continues as described above, and steps S316 to S330 may be repeated until it is determined that the flight path has reached the destination, as described in step S322.

Detailed embodiments of devices, systems incorporating such devices, and methods using the same are described herein. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in appropriately detailed structure.

What is claimed is:

1. A method for simulating a flight path of an aerial vehicle, the method comprising:
   receiving data regarding a starting point of the flight path;
   receiving data regarding prevailing wind patterns;
   generating a smooth model of wind vectors based on the data regarding prevailing wind patterns;
   generating a noise model, the noise model including one or more submodels simulating regional differences in prevailing wind patterns;
   determining a wind vector at the starting point;
   determining a noise value at the starting point;
   applying the noise value to the wind vector at the starting point to generate a noise added wind vector;
   determining displacement based on the noise added wind vector over a predetermined time step;
   determining a waypoint based on the displacement; and
   displaying the flight path on a map,
   wherein determining a noise value at the starting point includes:
      determining a portion of the noise value contributed by each submodel by mapping the one or more submodels to an unfolded unit cube to determine each submodel's distance in space and time from the starting point, and
      determining the noise value by calculating a weighted mean of the portion of the noise value contributed by each submodel.

2. The method according to claim 1, wherein the smooth model of wind vectors is generated using quad-linear interpolation.

3. The method according to claim 1, further comprising receiving data regarding an objective; and determining that the waypoint satisfies the objective.

4. The method according to claim 1, further comprising:
   receiving data regarding an objective;
   determining that the waypoint does not satisfy the objective;
   determining a wind vector at the waypoint;
   determining a noise value at the waypoint;
   applying the noise value at the waypoint to the wind vector at the waypoint to generate a noise added wind vector at the waypoint;
   determining displacement based on the noise added wind vector at the waypoint over a predetermined time step; and
   determining another waypoint based on the displacement.

5. The method according to claim 4, further comprising:
   receiving an instruction to change altitude to a new altitude,
   wherein determining the wind vector at the waypoint includes determining the wind vector at the waypoint at the new altitude.

6. The method according to claim 1, wherein the prevailing wind patterns is based on a speed and a direction of winds.

7. The method according to claim 1, wherein the noise model is a deterministic noise pattern for any point defined in four dimensions.

8. The method according to claim 7, wherein the four dimensions of the noise model include latitude, longitude, altitude, and time.

9. The method according to claim 7, wherein the noise value for a particular point defined in four dimensions is correlated to other points within a specified distance from the particular point.

10. The method according to claim 9, wherein the specified distance includes one or more of a horizontal distance, a vertical distance, and a temporal difference.

11. The method according to claim 10, wherein the horizontal distance is a zonal and/or meridional distance measured from the particular point.

12. The method according to claim 10, wherein the vertical distance is measured in an altitudinal distance from the particular point.

13. The method according to claim 12, wherein the altitudinal distance is measured based on a pressure metric.

14. The method according to claim 1, wherein the noise model is generated based on a seed value.

15. The method according to claim 14, wherein the noise model comprises a first noise submodel generated based on a first seed value and a second noise submodel generated based on a second seed value, the first noise submodel and second noise submodel having different noise values at a particular point.

16. A system for simulating a flight path of an aerial vehicle, the system comprising:
   an aerial vehicle;
   a display; and
   a computing device including:
      a processor; and
      a memory storing instructions which, when executed by the processor, cause the computing device to:
      receive data regarding a starting point of the flight path;
      receive data regarding prevailing wind patterns;
      generate a smooth model of wind vectors based on the data regarding prevailing wind patterns;
      generate a noise model, the noise model including one or more submodels simulating regional differences in prevailing wind patterns;
      determine a wind vector at the starting point;
      determine a noise value at the starting point;
      apply the noise value to the wind vector at the starting point to generate a noise added wind vector;
      determine displacement based on the noise added wind vector over a predetermined time step;
      determine a waypoint based on the displacement; and
      display the flight path on a map,
      wherein determining a noise value at the starting point includes:
         determining a portion of the noise value contributed by each submodel by mapping the one or more submodels to an unfolded unit cube to determine each submodel's distance in space and time from the starting point, and
         determining the noise value by calculating a weighted mean of the portion of the noise value contributed by each submodel.

17. A non-transitory computer-readable storage medium storing a program for simulating a flight path of an aerial vehicle, the program including instructions which, when executed by a processor, cause a computing device to:
   receive data regarding a starting point of the flight path;
   receive data regarding prevailing wind patterns;
   generate a smooth model of wind vectors based on the data regarding prevailing wind patterns;
   generate a noise model, the noise model including one or more submodels simulating regional differences in prevailing wind patterns;
   determine a wind vector at the starting point;
   determine a noise value at the starting point;
   apply the noise value to the wind vector at the starting point to generate a noise added wind vector;

determine displacement based on the noise added wind vector over a predetermined time step;
determine a waypoint based on the displacement
display the flight path on a map,
wherein determining a noise value at the starting point includes:
  determining a portion of the noise value contributed by each submodel by mapping the one or more submodels to an unfolded unit cube to determine each submodel's distance in space and time from the starting point, and
  determining the noise value by calculating a weighted mean of the portion of the noise value contributed by each submodel.

* * * * *